United States Patent [19]

Lim et al.

[11] Patent Number: 5,613,092
[45] Date of Patent: Mar. 18, 1997

[54] PERIPHERAL CARD HAVING AN ADAPTIVE PCMCIA COMPLIANT INTERFACE

[75] Inventors: Ricardo Lim, Richmond; David Russo, Burnaby; Barry Moss, Matsqui, all of Canada; Charles W. Bethards, Crystal Lake, Ill.

[73] Assignee: Motorola Inc., Schaumburg, Ill.

[21] Appl. No.: 299,383

[22] Filed: Sep. 1, 1994

[51] Int. Cl.$^6$ ............ G06F 13/00; G06F 15/177
[52] U.S. Cl. ............ 395/500; 364/238.5; 364/242.5
[58] Field of Search ............ 395/325, 500, 395/800

[56] References Cited

U.S. PATENT DOCUMENTS

| | | | |
|---|---|---|---|
| 5,345,367 | 9/1994 | Pierce et al. | 362/32 |
| 5,430,793 | 7/1995 | Ueltzen et al. | 379/98 |
| 5,436,621 | 7/1995 | Macko et al. | 340/825.44 |
| 5,440,244 | 8/1995 | Richter et al. | 326/37 |
| 5,491,827 | 2/1996 | Holtey | 395/800 |

*Primary Examiner*—Kevin J. Teska
*Assistant Examiner*—Ayni Mohamed
*Attorney, Agent, or Firm*—Kevin Buford

[57] ABSTRACT

A peripheral card (109) having an adaptive PCMCIA compliant interface including either an adaptive card present or card configuration function that includes a peripheral apparatus (209) arranged and constructed to operate in conjunction with a host computer (101) over a PCMCIA compliant interface, and an interface logic (205), coupled to the peripheral apparatus (209) and to a PCMCIA peripheral port (201), for interfacing the peripheral apparatus to the PCMCIA peripheral port (201), the interface logic further adaptively providing a card present signal at the PCMCIA peripheral port (201) when the peripheral apparatus (209) and the interface logic (205) expects the PCMCIA peripheral port (201) to be activated by the host computer (101) or alternatively adaptively providing configuration information pertaining to the peripheral apparatus to the host computer.

19 Claims, 2 Drawing Sheets

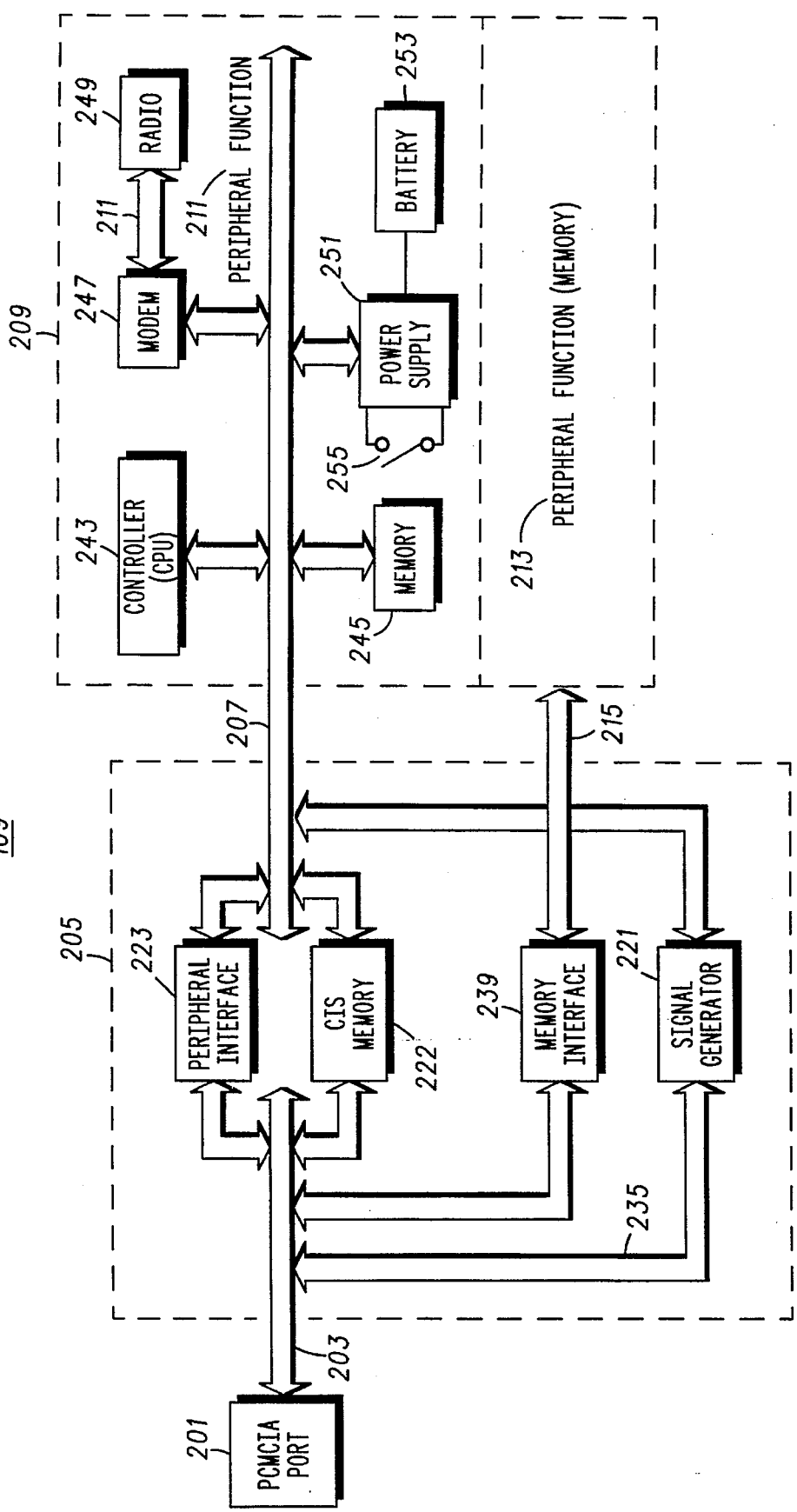

5,613,092

PERIPHERAL CARD HAVING AN ADAPTIVE PCMCIA COMPLIANT INTERFACE

FIELD OF THE INVENTION

This disclosure deals with peripheral functionality arranged and constructed to interface to a host computer and more specifically but not limited to such functionality in the form of peripheral cards having an adaptive PCMCIA compliant interface.

BACKGROUND OF THE INVENTION

General and special purpose host computers often include provisions for various peripheral functionality, such as a communications modem, memory expansion, or an add on hard disk drive. In order to facilitate the addition of various peripherals the Personal Computer Memory Card International Association (PCMCIA) has endeavored to standardize a family of peripheral cards with a requisite PCMCIA interface. The PCMCIA defined parameters can be found in the PC Card Standard Release 2.0 document, published by the Personal Computer Memory Card International Association, 1030B East Duane Avenue, Sunnyvale Calif. and incorporated herein by reference. The defined parameters include physical parameters such as dimensions, input/output connections such as control, address, and data buses, signal parameters such as operating levels and impedances, and certain operating procedures.

Among other specified attributes the physical interface defined by the PCMCIA standard is a 68-pin connection. To facilitate a logical interface between a host computer and a PCMCIA interface port it has been deemed necessary to define a manner or mechanism for determining whether a peripheral function is available at a PCMCIA port. The PCMCIA standard defines two signals at the interface port, referred to as card detect 1 and card detect 2 (CD1 and CD2), that allow the host computer to detect the presence of a card or more generally determine whether a peripheral function is available at the interface port. When CD1 and CD2 are asserted to a logic low the host computer may assume a PCMCIA card is present or plugged into the PCMCIA physical interface socket that is, typically, part of the host computer. Current PCMCIA peripherals or cards implement the card detection function by simply connecting the CD1 and CD2 connector pins to a ground potential on the card's printed circuit board (PCB). Since the peripheral or card is presumed to be powered by the host computer through the VCC (+5 V power) and GND pins on the 68-pin connector or interface, CD1 and CD2 get immediately asserted to the logic low level when the peripheral function is physically interfaced to the PCMCIA port by, for example, plugging the PCMCIA card into the host's PCMCIA card socket.

The PCMCIA standard defines the card detection scheme as follows. Initially, CD1 and CD2 are asserted low and the host detects that a card has been plugged into the socket. The host turns on the VCC supply for the socket and asserts the RESET signal to logic high and then logic low to reset the card. The host then reads the Card Information Structure (CIS) of the card to determine the configuration information or characteristics of the card. After reading the CIS, the host can use the card according to the functionality that is defined in the CIS. For example, if information in the CIS indicates that the card is a modem card, the host will use the card as a modem. If the CIS indicates that the card is a memory card, the host can use the card as its extended memory or as a place for file storage. Allowed variations of the contents of the CIS are defined by the PCMCIA standard.

For many peripheral functions such as a wireline modem, a memory card, or other relatively passive functions having no relevant purposes other than in conjunction with a host computer the present approach appears to be satisfactory and clearly within the limits envisioned by the FCMCIA standards. However where the peripheral function has meaningful independent or partially independent functionality the above standardized procedures may not be acceptable or at least not optimal. In these cases the peripheral function, often embodied on a PCMCIA compatible card likely will have, for example, an independent or at least supplemental power supply that may include an on/off switch. Among others, one problem this may present is the possibility that the peripheral function is physically interfaced or present at the PCMCIA port and its power supply is disabled by, for example, the on/off switch being in an 'off' state. Under these circumstances the card should not assert the CD1 and CD2 lines to a logic low because when it is not powered up the host cannot communicate with it. This problem is further compounded if the peripheral function is actually more than one function and only part of the functionality is independent.

One solution to this problem may be to define an alternative non-standardized proprietary interface port. This may be acceptable in the case of a special purpose host when the manufacturer has control of the host computer hardware and operating system software as well as the peripheral function. However this is not typically the case and does requires extra effort to develop the proprietary interface and assure ongoing compatibility with the operating software of the host and the peripheral function could not be made available to the market place at large.

Clearly a need exists for a peripheral function or card that has an adaptive PCMCIA compliant interface that may be generally employed when the peripheral function has independent functionality.

BRIEF DESCRIPTION OF THE DRAWINGS

The features of the present invention which are believed to be novel are set forth with particularity in the appended claims. However, the invention together with further advantages thereof, may best be understood by reference to the accompanying drawings wherein:

FIG. 2 is a block diagram of a preferred embodiment of the peripheral card depicted in FIG. 1.

DETAILED DESCRIPTION OF A PREFERRED EMBODIMENT

Generally this disclosure deals with a peripheral arrangement for a host computer. The peripheral arrangement includes a peripheral card that has an adaptive PCMCIA compliant interface that may be generally and advantageously employed when, among others, the peripheral arrangement includes independent functionality, such as may be present if a separate power supply or controller is included with the peripheral arrangement. One preferred embodiment is a PCMCIA card which has both peripheral, specifically a radio modem, and memory functions, an independent power supply source, and an apparatus for adaptively asserting the card detection signals CD1 and CD2 on the PCMCIA interface and adaptively providing card configuration information to the host computer.

Figure 1:
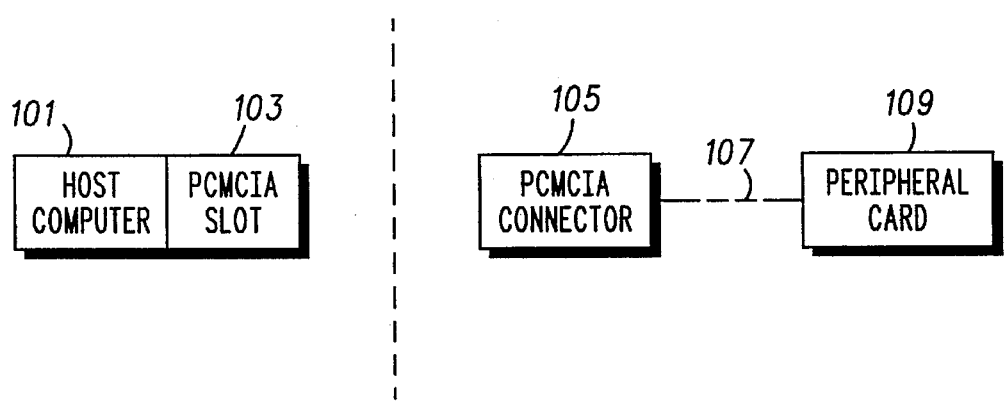
FIG. 1 is a block diagram of a host computer and peripheral arrangement suitable for employing an embodiment in accordance with the instant invention.

As an overview, one embodiment, included in a peripheral arrangement (100) depicted in FIG. 1, is a peripheral card (109), shown in detail in FIG. 2, having an adaptive card present function, that includes a peripheral apparatus (209) or more specifically, a peripheral function (211), such as a radio communications modem, and a memory unit (213), such as a disk drive or expansion random access memory, or a combination of these and others, that has been arranged, constructed, and is intended to operate at least in part in conjunction with a host computer. Further included is a PCMCIA peripheral port (201) and an interface logic (205) that is coupled to the peripheral apparatus and to the PCMCIA peripheral port. The interface logic is utilized for interfacing the peripheral apparatus to the PCMCIA peripheral port and in so doing further adaptively provides a card present signal at the PCMCIA peripheral port when the peripheral apparatus and the interface logic expect or appropriately determine that the PCMCIA peripheral port should be activated by the host computer.

The peripheral card (109) may take any physical form and be physically and electrically coupled to the host computer (101) by way of a cable (105) and a PCMCIA connector (105). Alternatively, the peripheral card (109) may take the physical form of a PCMCIA card or extended PCMCIA card and if so would include, co-located with the card, the PCMCIA connector (105), that is a 68 pin connector defined by the PCMCIA standard. In either event the PCMCIA connector (105) would be coupled to the host computer (101) at a PCMCIA slot (103). In the case of a PCMCIA card having an adaptive card present function the peripheral apparatus (209) operates in conjunction with a host computer over a PCMCIA compliant interface, and the PCMCIA card further specifically includes a signal generator (221), coupled to said peripheral apparatus, for selectively generating a card present signal at the PCMCIA compliant interface when the peripheral apparatus expects the PCMCIA compliant interface to be active.

In either the peripheral or PCMCIA card, the peripheral apparatus (209) may further include a power supply (219) that is arranged to provide power to the peripheral apparatus and the power supply may be selectively enabled and disabled at a switch (255) or due to a failure such as a battery (223) being discharged disconnected, etc. Under certain circumstances, it likely will be advantageous for the interface logic (205) or signal generator (221) to forego generating the card present signal when the power supply is disabled, at least for a period of time.

A further embodiment of a peripheral or PCMCIA card having an adaptive PCMCIA compliant interface includes a peripheral or PCMCIA card having adaptive card configuration capability. These embodiments include an apparatus or peripheral apparatus that further includes a first and a second peripheral function that is arranged and constructed to operate in conjunction with a host computer, respectively, a PCMCIA peripheral port or over a PCMCIA compliant interface, and, respectively, an interface logic, coupled to the apparatus and to the PCMCIA peripheral port, for interfacing the apparatus to the PCMCIA peripheral port, where the interface logic adaptively provides configuration information to the host computer or an interface logic, coupled to the peripheral apparatus, for adaptively providing configuration information pertaining to the peripheral apparatus to the host computer. The specifics of the configuration information depend on the particulars of the peripheral apparatus and may be found within the PCMCIA standard.

The peripheral or PCMCIA card's interface logic further generates a card present signal at, respectively, the PCMCIA peripheral port or PCMCIA complaint interface when the apparatus determines or expects the PCMCIA peripheral port to be active. The peripheral or PCMCIA card may further include a controller that operates to interrupt the card present signal and to adaptively modify the configuration information after the card present signal has been interrupted. When the peripheral or PCMCIA card further includes a power supply, arranged to selectively provide power to the apparatus or peripheral apparatus, the interface logic will forego generating the card present signal when the power supply is disabled. This combination of interrupting the card present signal and adaptively modifying the configuration information may be beneficially taken advantage of when the first peripheral function includes, for example a radio modem or when, additionally the second peripheral function includes a memory module. In these or other circumstances the interface logic will provide configuration information corresponding to the first peripheral function or further provide configuration information corresponding to the second peripheral function or configuration information corresponding to a combination of the first and the second peripheral functions depending, for example, on which peripheral functions are available or active.

With that as an overview a preferred embodiment in accordance with the instant invention will be further explained with reference to the Figures, in which FIG. 1 is a block diagram of a host computer (101) and a peripheral arrangement (100) suitable for employing a preferred embodiment in accordance with the instant invention. Depicted in FIG. 1 is the host computer (101) having a PCMCIA socket (103) and the peripheral arrangement (100) further including a peripheral card or device (109), a PCMCIA connector (105), and a physical connection (107) between the PCMCIA connector (105) and the peripheral card (109). The peripheral arrangement (100) is coupled, interface, or connected to the host computer (101) by plugging the PCMCIA connector (105) of the peripheral arrangement into the PCMCIA socket (103) of the host computer. All these elements (105), (107), and (109) of the peripheral arrangement (100) may be physically located on one PCMCIA compliant or consistent card or the PCMCIA connector (105) may be physically separated from the peripheral card (109) with the physical connection (107), such as a cable, connecting the two. The host computer (101) can be any general purpose computer that includes functionally and logically as well as, preferably, physically a PCMCIA interface that operates according to the PCMCIA standards. The preferred embodiment of the instant invention is considered to be consistent or compliant with the PCMCIA standards and defined PCMCIA interfaces and ports provided it operates at least in part with this PCMCIA interface without requiring modifications to the host computer's hardware, operating system software, or other attributes.

Referring to FIG. 2, wherein like reference numerals refer to like elements from FIG. 1, a block diagram of a preferred embodiment of the peripheral card (109) is shown. The peripheral card (109) includes a PCMCIA port (201) that is inter coupled to the connector (105) either via the cable or directly when the peripheral card (109) is fully compliant with all physical requirements of a PCMCIA card, in which case a PCMCIA bus (203) connects directly to the PCMCIA connector (105). Further included is an interface logic (205) and a peripheral apparatus or apparatus (209).

The interface logic (205) generally operates to provide an interface between the peripheral apparatus (209) and the PCMCIA port (201) or connector (105) via, respectively, a peripheral bus and memory bus (207, 215) and a PCMCIA bus (203). The interface logic (205) includes a signal generator (221), a card information structure (CIS) memory (222), a memory interface (239), and a peripheral interface (223) all coupled in relevant part as depicted to the PCMCIA port (201) and to the peripheral bus (207) or the memory bus (215). The signal generator (221) is coupled to the PCMCIA bus (203) at a connection (235) that includes the CD1 and CD2 signals and generally operates to assert these signals under relevant circumstances as, preferably, determined by signals on the peripheral bus (207) but alternatively determined by signals generated within the interface logic (205) or some combination thereof. The peripheral interface (223) interfaces the PCMCIA bus to the peripheral bus (207) by way of, from the host computer's perspective, a well known universal asynchronous receiver transmitter (UART) like interface. The memory interface (239) interfaces the PCMCIA bus (203) to the memory bus (215) by way of a standard or conventional expanded memory type of bus. The CIS memory (222) is coupled to the PCMCIA bus (203) in a read only configuration and to the peripheral bus (207) in a programmable fashion. The various interfaces are well known in the art or alternatively included within and specified by the PCMCIA standard.

The peripheral apparatus (209) further includes a first peripheral function (211), preferably, a radio communications modem or other peripheral function having some independent functionality or utility, and, a second peripheral function, preferably, a memory module (213) but possibly any other peripheral function whether having independent functionality or otherwise. When the apparatus (209) has a first peripheral function (211) only, the adaptive card detect utility disclosed herein continues to advantageously apply, however the adaptive card configuration utility would have a limited purpose.

In any event the preferred embodiment of the first peripheral function (211), a radio communications modem, includes, all inter coupled as depicted, a controller, preferably, a central processing unit CPU (243), such as a Motorola MCM68300 series microprocessor, a memory (245) used by the CPU (243), a modem (247) coupled to a radio (249) and arranged to modulate and demodulate data and transceive such data over a communications medium all as well known in the art, a power supply (251) with a power switch (255), and a power source, preferably, battery (253) that is coupled to the power supply (251). Circuitry, well known, in the power supply (251) allows the CPU (243) to detect the status of the power supply (251) in order to facilitate a well ordered shut down of the CPU (243), etc. This includes detecting the status of the power switch (255) and controlling the shutdown of the power supply (251) when the power switch (255) is toggled from the ON to OFF position in order to facilitate the adaptive card configuration utility. The memory module (213) is arranged and constructed, as well known, to serve as an extended or expanded memory and is preferably RAM, but may be any other form of memory including, for example, a disk drive.

In the preferred embodiment, the CIS memory (222), memory interface (239), and signal generator (221) of the interface logic (205) and the memory module (213) are powered by the VCC (+5 V power) supply of the PCMCIA interface bus (203) such that they may still be operational when the peripheral function (211) is powered down by the power switch (255) being in the OFF position or the battery (253) being discharged or removed from the peripheral card (109). Furthermore, the CIS memory (222) and signal generator (221) are also alternatively powered by the peripheral function (211) such that the CPU (243) can program the CIS and signal generator (221) when the peripheral card (109) is not logically plugged into the socket (103). The CIS memory (222) is, preferably, battery-backed RAM but alternatively programmable ROM such as EEPROM or Flash EPROM such that its contents are preserved when the peripheral function (211) is powered down and the peripheral card (109) is not plugged into the socket (103).

Figure 3:
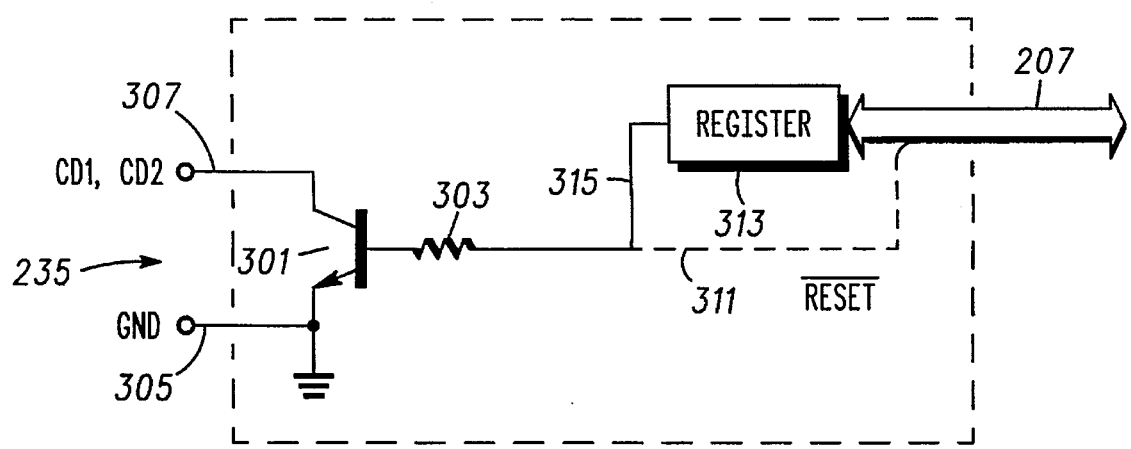
FIG. 3 is a diagram of a preferred embodiment of the signal generator depicted in FIG. 2.

Referring to FIG. 3 a preferred embodiment of the signal generator (221) of FIG. 2 is depicted. The connection (235) to the PCMCIA bus (203) includes a ground (305) signal and the CD1 and CD2 signals (307). The signal generator (221) includes a transistor (301) and a base resistor (403) which are used to drive or assert CD1 and CD2 (307) to a logic low and a card present register (313), preferably a single bit register, that can be written by the CPU (243) over the peripheral bus (207). When the card-present register (313) is logic high, an output (315) drives the transistor (301) to assert the CD1 and CD2 signals (307) to a logic low to indicate to the host computer (101) that a peripheral card is present (plugged in). When the output (315) of the card-present register (313) is logic low, CD1 and CD2 (307) are de-asserted. In the preferred embodiment, the card-present register (313) may be a battery-backed register or programmable ROM (such as EEPROM or Flash EPROM) such that its state is preserved when the peripheral function (211) is powered down and the peripheral card (109) is not plugged into the socket (103).

Initially, the CIS memory (222) is programmed in the card manufacturer's factory with data to indicate that the peripheral card (109) has only a memory function (213), and the card-present register (313) is programmed to logic high which drives the transistor (301) to assert the CD1 and CD2 signals (307). During normal operation of the peripheral card (109) with a fresh battery source (253), when the peripheral arrangement (100) is coupled to the host computer, specifically the PCMCIA connector (105) is plugged into the PCMCIA socket (103) of the host computer (101), and the power switch (255) is in the OFF position, the CD1 and CD2 signals (307) are asserted because the card-present register (313) was programmed to logic high in the factory. The host computer (101) reads the CIS and determines that the peripheral card (109) has only the memory function (213) active and thereafter uses the memory function as extended memory for the host computer (101).

When the user toggles the power switch (255) from the OFF to the ON position, the controller or CPU (243) powers up and runs. The CPU (243) then initiates a series of actions that result in the interface logic (205), specifically the signal generator (222), selectively generating the card present signal (335) at the PCMCIA compliant interface or PCMCIA port when the peripheral apparatus expects the PCMCIA compliant interface to be active. Initially, responsive to the CPU, the signal generator (222) interrupts the card present signal by de-asserting or foregoing asserting the CD1 and CD2 signals (307) thus signaling to the host computer that the PCMCIA peripheral port should no longer be activated, then the CPU adaptively modifies or reprograms the CIS memory (222) to indicate that both the peripheral (211) and memory (213) functions are available, and then the signal generator (222) generates a card present signal at the PCMCIA compliant interface by reasserting the CD1 and CD2 signals (307) thus indicating that the peripheral apparatus expects the PCMCIA compliant interface to be active or specifically so that the host computer will recognize or re recognize that a peripheral card is present and read the new configuration information from the CIS memory (222). In this fashion the interface logic (205) has adaptively, in accordance with the operational configuration of the peripheral apparatus (209), provided configuration information pertaining to the peripheral apparatus to the host computer (101).

However, before de-asserting the CD1 and CD2 signals, the CPU (243) must first assert a RDY+/BSY− signal on the PCMCIA bus (203) to logic low to indicate to the host computer (101) that the peripheral card (109) is busy, as defined in the PCMCIA standard. The CPU (243) writes a logic high to a single-bit register in the peripheral interface (223) to make a request to assert the RDY+/BSY− signal. Circuitry in the peripheral interface (223) checks the PCMCIA bus (203) to ensure that RDY+/BSY− is not asserted during the middle of a read or write cycle to memory (213) by the host computer (101). It waits for any bus cycles to finish before asserting RDY+/BSY− to logic low and sets a status bit, that the CPU (243) can read from the peripheral bus (207), to indicate that RDY+/BSY− has been asserted to logic low.

After the assertion of RDY+/BSY−, the CPU (243) writes a logic low to the card-present register (313) to de-assert CD1 and CD2 (307) so that, from the perspective of the host computer (101), the peripheral card (109) looks like it has been unplugged or removed although physically it has not. The CPU (243) then reprograms the CIS memory (222) with data to indicate to the host computer (101) that both a peripheral (211), preferably a radio communications modem, and a memory function (213) are available or active. Next, the CPU (243) indicates to the host computer (101) that the peripheral apparatus expects the PCMCIA compliant interface to be active by writing a logic high to the card-present register (313) to reassert CD1 and CD2 (307) so that, from the perspective of the host computer (101), a peripheral card (109) has been plugged into the socket (103). The CPU (243) also writes logic low to the RDY+/BSY− request register in the peripheral interface (223) to set the RDY+/BSY− signal on the PCMCIA interface (203) to logic high indicating that the peripheral card (109) is ready for data transfers. The host computer, sensing the card-present signal, then reads the CIS memory (222) and decodes that a radio communications modem (211) and memory (213) are available on the peripheral card (109).

When the power switch (255) is toggled from the ON position to the OFF position thereby selectively disabling the power supply, the CPU (243) senses this condition and, before powering off, starts the procedure of writing logic high to the RDY+/BSY− request register in the peripheral interface (223) to assert the RDY+/BSY− signal low indicating "busy", writing logic low to the card-present register (313) to de-assert CD1 and CD2 (307) thereby foregoing generating the card present signal, reprogramming the CIS memory (222) to indicate that only the memory function (213) is available, writing logic high to the card-present register (313) to reassert CD1 and CD2 (307), and writing logic low to the RDY+/BSY− request register in the peripheral interface (223) to de-assert the RDY+/BSY− signal to high indicating "ready". The preceding procedures are followed in the same manner as the one described above when the power switch (255) is toggled from the OFF position to the ON position thereby selectively enabling the power supply.

When the radio communications modem (211) is powered off, with the power switch (255) being in the OFF position and the CIS memory (222) programmed to indicate that only the memory function (213) is available, and the power switch (255) is then toggled from the OFF to ON position, the CPU (243) powers up as described above. If the voltage level of the battery (253) is too low for the radio communications modem to operate reliably but the CPU (243) can still run, the CPU will not have to go through the procedure of reprogramming the CIS memory (222), even though the power switch (255) is in the ON position. Under these circumstances the peripheral function (211) is effectively not available because of the low power source voltage and the CPU (243) is managing that interface.

For a peripheral card (109) that only has a Peripheral (211) and no Memory module (213), the embodiment for the signal generator (221) shown in FIG. 3 will not need the card-present register (313). Instead, the base resistor (303) may be coupled directly to an active-low RESET signal available on the peripheral bus (207). Whenever the CPU (243) is running, the RESET signal or line is high which drives the transistor (301) and asserts the CD1 and CD2 signals (307). There is no need for the card-present register (313) because the CPU (243) does not require the adaptive configuration utility described in the preferred embodiment above. As noted earlier and known a peripheral card with relatively passive functionality, such as a memory module need only tie the CD1 and CD2 lines to ground.

It will be appreciated by those of ordinary skill in the art that the apparatus and procedures disclosed provide various approaches for adaptively controlling the characteristics, such as the card detect and card configuration functions of an otherwise PCMCIA compliant interface. These inventive approaches may be readily and advantageously employed in a peripheral card intended to interface to a host computer to adaptively control the apparent functionality of the peripheral card, without otherwise sacrificing the relative advantages of having a standardized interface or unduly burdening the peripheral card development procedures and practitioners. Hence, the present invention, in furtherance of satisfying a long-felt and growing need in the field facilitates an adaptive PCMCIA compliant interface between a host computer and a peripheral card thus providing an exemplary approach to constructing peripheral cards with enhanced functionality or utility that retain compatibility with the PCMCIA standard.

It will be apparent to those skilled in the art that the disclosed invention may be modified in numerous ways and may assume many embodiments other than the preferred form specifically set out and described above. For example while one embodiment of a peripheral card has been discussed others, including those having two peripheral functions each with independent functionality clearly exist and may be accommodated with minor modifications to the signal generator of FIG. 3. Accordingly, it is intended by the appended claims to cover all modifications of the invention which fall within the true spirit and scope of the invention.

What is claimed is:

1. A peripheral card adapted for use in combination with a host processor, the card, comprising:

an RF modem;

a host interface unit;

a first bus coupling the RF modem to the interface unit; and a second bus coupled to the interface unit and adapted for coupling the interface unit to the host processor, wherein;
the interface unit comprises a peripheral unit status signal generator having an input coupled to the RF modem via the first bus and an output adapted for coupling to the host processor via the second bus for outputting first and second status signals indicative of first and second statuses, respectively, of the peripheral card to the host processor;

said RF modem comprises a processor for controlling the signal generator to output one of the first and second status signals; and the peripheral card further comprises a configuration memory coupled to the RF modem processor and the second bus for storing card configuration data and for read access by the host processor, the RF modem processor also having write access to change the card configuration data.

2. A peripheral card adapted for use in combination with a host processor, the card comprising:

a peripheral unit;

a host interface unit;

a first bus coupling the peripheral unit to the interface unit; and a second bus coupled to the interface unit and adapted for coupling the interface unit to the host processor, wherein the interface unit comprises a peripheral unit status signal generator having an input coupled to the peripheral unit via the first bus and an output adapted for coupling to host processor via the second bus for outputting a first and second status signals indicative of a first and second status, respectively, of the peripheral card to the host processor, and wherein the card further comprises a power supply having at least an on state and an off state and coupled to the peripheral unit processor, the peripheral unit processor controlling the signal generator to output a different status signal when the power supply changes state.

3. A peripheral card adapted for use in combination with a host processor, the card, and comprising:

a peripheral apparatus arranged and constructed to operate in conjunction with the host computer the peripheral apparatus comprising a controller;

a peripheral port adapted for coupling the peripheral apparatus to the host processor;

a power supply arranged to provide, when enabled, power to said peripheral apparatus; and an interface logic, coupled to said peripheral apparatus and to said peripheral port, for interfacing said peripheral apparatus to said peripheral port, said interface logic further adaptively providing a card present signal at said peripheral port when said peripheral apparatus expects said peripheral port to be activated by said host computer, the interface logic comprising configuration change means for disabling the card present signal responsive to a first signal from the controller indicative of a change in status of the power supply, for changing a configuration store responsive to data from the controller, and for reasserting the card present signal responsive to a further signal from the controller.

4. The peripheral card of claim 3 wherein said interface logic foregoes providing said card present signal when said power supply is disabled.

5. The peripheral card of claim 3 wherein said peripheral apparatus is a radio modem.

6. A peripheral card having adaptive card configuration capability, comprising:

a peripheral apparatus comprising a first peripheral function and a second peripheral function, said peripheral apparatus arranged and constructed to operate in conjunction with a host processor when coupled via an interface port, the first peripheral function being further capable of operating independently when not coupled to the host processor;

an interface logic, coupled between said peripheral apparatus and said interface port, adaptively changing configuration information pertaining to said peripheral apparatus in response to the peripheral apparatus and providing the configuration information to said host processor and generating a card present, signal at said interface port in response to a change in status of the first peripheral function; and a controller, said controller operating to interrupt said card present signal and to adaptively modify said configuration information after said card present signal has been interrupted.

7. The peripheral card of claim 6 further including a power supply arranged to selectively provide power to said peripheral apparatus.

8. The peripheral card of claim 7 wherein said interface logic foregoes generating said card present signal when said power supply is disabled.

9. The peripheral card of claim 6 wherein said first peripheral function includes a radio modem.

10. The peripheral card of claim 9 wherein said second peripheral function includes a memory module.

11. The peripheral card of claim 6 wherein said interface logic provides configuration information corresponding to said first peripheral function.

12. The peripheral card of claim 11 wherein said interface logic further provides configuration information corresponding to said second peripheral function.

13. A peripheral card having adaptive card configuration capability, comprising:

an apparatus including a first peripheral function and a second peripheral function arranged and constructed to operate in conjunction with a host processor, a peripheral port, and an interface logic, coupled between said apparatus and said peripheral port, interfacing said apparatus to said peripheral port, said interface logic adaptively providing configuration information to said host computer and generating a card present signal at said peripheral port in response to a change in status of the first peripheral function, wherein the apparatus comprises a controller, said controller operating to interrupt said card present signal and to adaptively modify said configuration information after said card present signal has been interrupted.

14. The peripheral card of claim 13 further comprising a power supply coupled to the apparatus and arranged to selectively provide plural power levels to said apparatus.

15. The peripheral card of claim 14 wherein said interface logic foregoes generating said card present signal when said power supply is changed from a first to a second of said plural power levels.

16. The peripheral card of claim 13 wherein said first peripheral function includes a radio modem.

17. The peripheral card of claim 16 wherein said second peripheral function includes a memory module.

18. The peripheral card of claim 13 wherein said interface logic provides configuration information corresponding to said first peripheral function.

19. The peripheral card of claim 18 wherein said interface logic further provides configuration information corresponding to said second peripheral function.

* * * * *